United States Patent [19]

Twardowska

[11] Patent Number: 4,489,183

[45] Date of Patent: Dec. 18, 1984

[54] STABILIZATION OF RED PHOSPHORUS

[75] Inventor: Helena Twardowska, Mississauga, Canada

[73] Assignee: ERCO Industries Limited, Islington, Canada

[21] Appl. No.: 561,039

[22] Filed: Dec. 13, 1983

[51] Int. Cl.³ .................. C01B 25/01; C08K 3/32; C08L 63/00; C08L 61/28

[52] U.S. Cl. ................. 523/440; 423/265; 423/266; 423/322; 523/451; 524/80; 524/414; 524/597

[58] Field of Search ............. 523/440, 451; 524/80, 524/414, 597; 423/322, 265, 266

[56] References Cited

U.S. PATENT DOCUMENTS

| | | | |
|---|---|---|---|
| 4,092,460 | 5/1978 | Cerny et al. | 524/80 |
| 4,188,313 | 2/1980 | Cerny et al. | 524/80 |
| 4,193,907 | 3/1980 | Tacke et al. | 524/80 |
| 4,208,317 | 6/1980 | Cerny et al. | 524/80 |
| 4,210,630 | 7/1980 | Dany et al. | 423/322 |
| 4,315,897 | 2/1982 | Staendeke et al. | 423/322 |
| 4,356,282 | 10/1982 | Largman | 423/322 |
| 4,421,728 | 12/1983 | Twardowska | 423/322 |

FOREIGN PATENT DOCUMENTS 1097152 3/1981 Canada ............ 423/322

Primary Examiner—Ronald W. Griffin
Attorney, Agent, or Firm—Sim & McBurney

[57] ABSTRACT

Particulate red amorphous phosphorus is stabilized against oxidation and phosphine formation by the use of a combination of titanium dioxide or titanium phosphate and an organic resin, usually an epoxy resin, a melamine-formaldehyde resin or a urea-formaldehyde resin.

10 Claims, 4 Drawing Figures

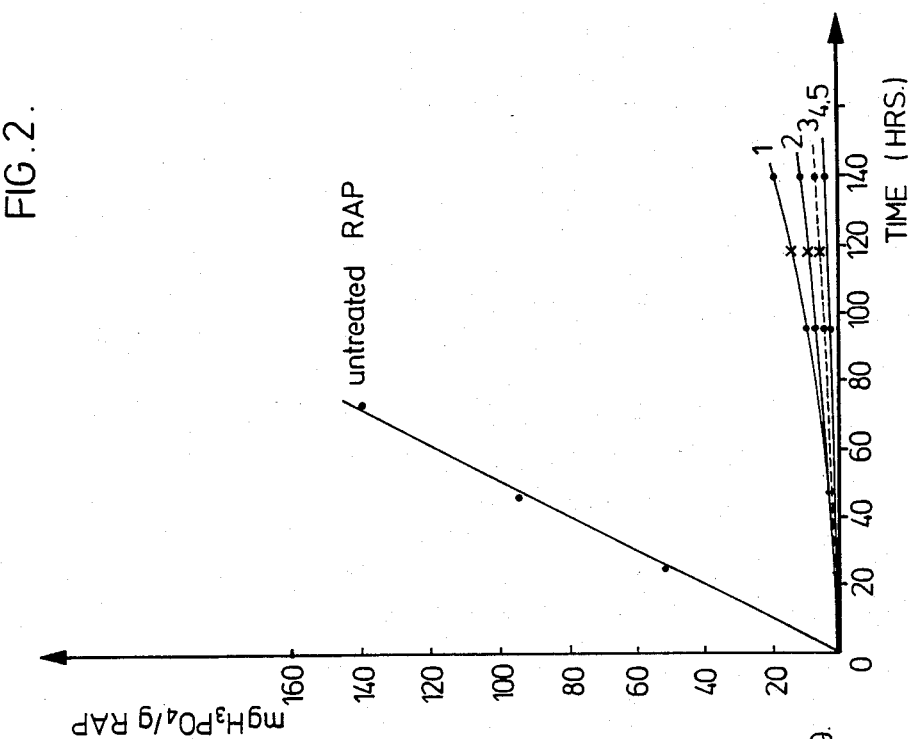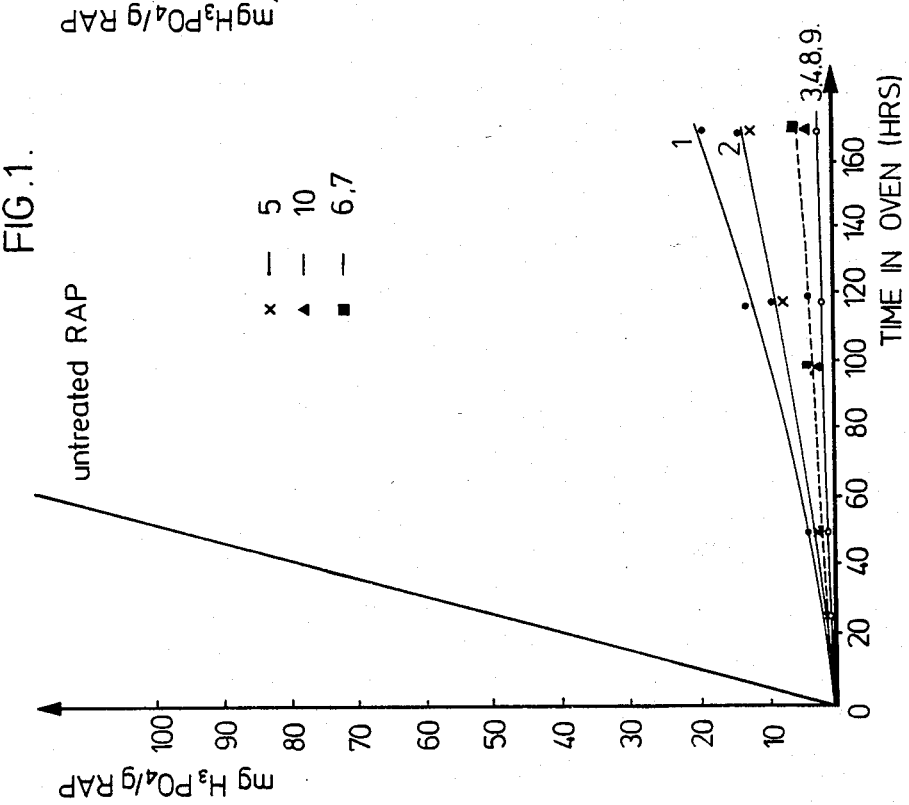

STABILIZATION OF RED PHOSPHORUS

FIELD OF INVENTION

The present invention relates to the stabilization of red phosphorus against oxidation.

BACKGROUND TO THE INVENTION

It is known that red phosphorus undergoes a chemical reaction upon storage in a moist atmosphere to form phosphine and various acids of phosphorus, mainly phosphorous acid and phosphoric acid. The formation of the highly toxic phosphine gives rise to hazardous working conditions and unpleasant odours and the formation of the phosphorous and phosphoric acids is undesirable in end uses of red phosphorus. Aluminum in the form of its hydroxide has been widely used to stabilize red phosphorus against such degradation. However, relatively large amounts of aluminum are required to achieve a significant degree of stabilization.

An additional problem which arises with the prior art aluminum treatment is that the product is difficult to process. A layer of alumina is precipitated onto the red phosphorus particles in an aqueous dispersion thereof and the treated red phosphorus is filtered and dried. Efficient filtration of the treated red phosphorus is difficult to achieve as a result of gelation of the aluminum hydroxide and large quantities of water are retained by the aluminum hydroxide.

More recently, as described in my copending U.S. patent application Ser. No. 396,125 filed July 7, 1982 (now U.S. Pat. No. 4,421,728), it has been found that stabilization of red phosphorus can be achieved using titanium dioxide or titanium phosphate in lesser quantities than required for aluminum hydroxide treatment and further that the treated red phosphorus is readily and rapidly filtered. Another advantage of the titania-treated red phosphorus is that it may be heated at elevated temperatures up to 300° C. without the evolution of water, so that the product is suitable for addition to plastics which are processed at high temperatures.

It has also been suggested in Canadian Pat. No. 1,097,152 to stabilize red phosphorus against oxidation by superficially covering each red phosphorus particle with a thin film of a hardened melamine-formaldehyde resin.

It further has been suggested in U.S. Pat. No. 4,315,897 to stabilize red phosphorus against oxidation by the simultaneous treatment of red phosphorus particles by aluminum hydroxide and hardened epoxy resin.

SUMMARY OF INVENTION

In accordance with the present invention, it has now been surprisingly found that a combination of titanium in the form of titanium dioxide or titanium phosphate and an organic resin is particularly effective as a stabilizer for red phosphorus. In this invention, the stabilization is both the retardation of oxidation of red phosphorus and the inhibition of phosphine formation.

The organic resin which is utilized in the present invention is an epoxy resin, a melamine-formaldehyde resin or a urea-formaldehyde resion. When the combination of $TiO_2$ with epoxy resin is employed in this invention, the improvement in stability against oxidation which is attained in comparison with treatment with resin alone is considerably greater than that which is attained using the prior art combination of aluminum hydroxide and epoxy resin.

BRIEF DESCRIPTION OF DRAWINGS

FIG. 1 is a graphical representation of the effect of titanium dioxide and an epoxy resin on the oxidation stability of red phosphorus;

FIG. 2 is a graphical representation of the effect of titanium dioxide and an epoxy resin on the oxidation stability of wet red phosphorus;

GENERAL DESCRIPTION OF INVENTION

Figure 4:
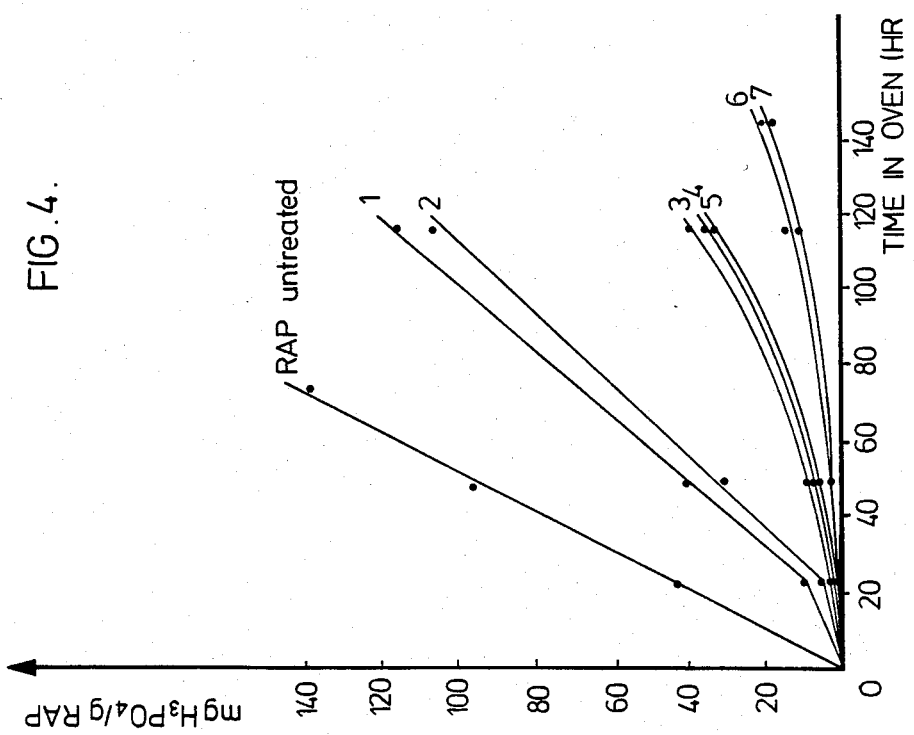
FIG. 4 is a graphical representation of the effect of titanium dioxide and urea-formaldehyde resins on the oxidation stability of red phosphorus.

The organic resin which is used to treat red phosphorus in accordance with this invention is employed in an uncured form and is either water soluble or water emulsifiable. One organic resin which may be used in this invention is an epoxy resin. Epoxy resins are thermosetting resins based on the reactivity of the epoxide group. One common type of such resins is made from epichlorohydrin and aromatic and aliphatic polyols, such as 2,2-bis-(4-hydroxyphenyl)-propane (bisphenol A) and have terminal glycidyl ether structures, contain many hydroxyl groups and cure readily with water-soluble, internally-modified polyamines. Curing or hardening usually is effected in the aqueous phase at a temperature of about 20° to about 90° C. while maintaining a pH value of the aqueous phase of about 5 to 9. The epoxy resins which may be used in this invention usually have an epoxy equivalent weight of about 170 to 500.

A further organic resin which may be used in this invention is a melamine-formaldehyde resin. Melamine-formaldehyde resins are amino resins made from melamine and formaldehyde. The first step in formation of those resins is the formation of trimethylol melamine, the molecules of which contain a ring of three carbon and three nitrogen atoms. This molecule, or polymer thereof, is reacted with formaldehyde. Lower molecule weight uncured melamine resins are water-soluble syrups and are preferred in this invention. Curing is effected by heat and acidity.

Another organic resin which may be used in this invention is a urea-formaldehyde resin. Urea-formaldehyde resins are a further class of amino resins and are formed in a two-stage process involving the initial formation of methylolureas which are subsequently thermoset by controlled heating and pressure in the presence of acid catalysts.

The red phosphorus, which is treated in accordance with this invention, is in particulate form with a size of at most 2 mm and preferably about 0.01 to 0.15 mm. The red phosphorus particles are treated with titanium dioxide or titanium phosphate and an organic resin. The quantity of titanium compound used may vary from about 0.05 to about 1.0 wt%, expressed as Ti, and the quantity of organic resin used may vary from about 0.1 to about 5 wt%.

The treatment of the red phosphorus particles with titanium dioxide or titanium phosphate and organic resin usually is effected in two steps, with titanium dioxide or titanium phosphate first being precipitated on the particles and subsequently the organic resin is crosslinked to deposit on the red phosphorus particles. The treatments with titanium dioxide or titanium phosphate and organic resin may be effected simultaneously, if desired.

The treatment of the red phosphorus by titanium dioxide may be effected in the aqueous phase to cause the precipitation of hydrated titanium dioxide on the red phosphorus. In this procedure, the red phosphorus particles may be suspended in water and the resulting slurry heated to about 25° to about 70° C., preferably about 40° to about 50° C. The heated slurry is gradually mixed with the required amount of a water-soluble titanium salt, for example, titanium sulphate, to achieve the desired treatment level at a slightly acid pH. The pH of the slurry then is adjusted to a value in the range of about 2 to about 4 to effect precipitation of hydrated titanium dioxide on the red phosphorus particles.

The slurry next is treated with the organic resin material. The manner and conditions of organic resin treatment depend on the form and nature of the resin used to treat the red phosphorus particles. Usually, the resin is added to the slurry in an uncured form and is cured on the surface of the red phosphorus particles.

For example, when the organic resin is an epoxy resin, an aqueous dispersion of uncured epoxy resin is admixed with the slurry of titanium compound-treated red phosphorus particles in an amount sufficient to provide the desired treatment level and thereafter an aqueous solution of hardener for the epoxy is added to the slurry. The pH of the slurry is raised to about 4 to about 6 and the slurry stirred for a time to permit cross-linking to occur at a temperature of about 40° to about 80° C., preferably about 50° to about 65° C., usually for about 0.5 to about 2 hours. Thereafter, the pH of the slurry is again raised to about 7 to 8 and the cross-linking completed over about 10 to about 30 minutes.

When the organic resin is a melamine-formaldehyde resin, an aqueous solution of a heat-curable uncured melamine-formaldehyde resin is added to the slurry of titanium compound-treated red phosphorus particles and the pH of the slurry adjusted to about 2.5 to about 4. The slurry then is heated to about 80° to about 100° C. to effect heat-curing of the resin, in about 0.5 to about 2 hours.

When the organic resin is a urea-formaldehyde resin, an aqueous solution of uncured urea-formaldehyde resn is added to the slurry of titanium compound-treated red phosphorus particles. The pH of the slurry is adjusted to about 2.5 to about 4.0, the slurry is heated to about 80° to about 100° C. to effect curing of the resin, in about 0.5 to about 2 hours.

The treatment of the red phosphorus particles by titanium phosphate may be effected in the aqueous phase in analogous manner to the aqueous phase treatment by titanium dioxide described above except that orthophosphoric acid or a water-soluble salt of orthophosphoric acid, for example, sodium dihydrogen phosphate, and titanium sulphate are added to the slurry, rather than titanium sulphate alone. Following precipitation of the titanium phosphate, the slurry next is treated with the organic resin, as described above for titanium dioxide treatment.

Following completion of the resin-precipitation step, the mixture is filtered, the treated red phosphorus is washed with water, dried and dehydrated at a temperature of about 100° to about 130° C. in a vacuum oven.

Red phosphorus which is treated with titanium dioxide or titanium phosphate and an organic resin in accordance with the present invention possesses improved properties having regard to the prior art. Red phosphorus treated with titanium dioxide and an epoxy resin has greater stability to degradation to form oxidation products and phosphine than red phosphorus treated with titanium dioxide at the same titanium concentration level and the same stability can be achieved using lesser quantities of titanium dioxide. Improved stability results in a decrease in acid formation and a decrease in the generation of phosphine upon storage of the treated red phosphorus. The presence of the titanium dioxide or titanium phosphate on the red phosphorus appears to contribute most to the low formation of acid while the presence of the organic resin on the red phosphorus appears to contribute most to low phosphine production.

Red phosphorus which is treated with titanium dioxide and a melamine resin, while having a lesser stability than red phosphorus treated with titanium dioxide and an epoxy resin, possesses good water dispersibility, which is advantageous in certain end uses of the red phosphorus, such as in the match industry.

Red phosphorus which has been treated in accordance with this invention requires much less time to filter and exhibits a much lower water retention than aluminum hydroxide-treated red phosphorus, resulting in a significant decrease in the processing time required, as compared with aluminum hydroxide treatment.

EXAMPLES

Example 1

This Example illustrates stabilization of red phosphorus by a combination of titanium dioxide and hardened epoxy resin.

Red amorphous phosphorus (RAP) of particle size typically 0.15 to 0.01 mm was suspended in water to a concentration of 25 g in 100 ml of water and heated to 60° C. with stirring. Varying quantities of titanium sulphate were added to samples of the slurry and the pH of the slurry adjusted to a value of 3 to cause precipitation of hydrated titanium dioxide thereon. The quantity of $TiO_2$ deposited is expressed in these Examples as ppm of Ti herein.

An aqueous dispersion of an unhardened epoxy resin then was admixed with the suspension of red phosphorus particles and a solution of epoxy resin hardener added. The epoxy resin used was that sold under the trademark D.E.R. 324 by Chemroy Chemicals Ltd. This resin is a blend of D.E.R. 331 epoxy resin and an aliphatic reactive diluent which is $C_{12}$ to $C_{14}$ aliphatic glycidyl ether. D.E.R. 324 has an epoxy equivalent weight of 197 to 206 and a viscosity at 25° C. of 600 to 800 cps. D.E.R. 331 is a product of the reaction of bisphenol A with epichlorohydrin, has an epoxy equivalent weight of 182 to 190 and a viscosity at 25° C. of 11,000 to 14,000 cps. The resin was employed in the form of an emulsion in water (3 g of resin in 50 ml of water) with the addition of 1% of surfactant Tween 20 (sorbitol monostearate). The hardener was that designated TSX11-548 by Henkel & Co. Hardener TSX11-548 is a water-reducible fatty amido amine having an amine value from 385 to 410 and was used in the form of a water dispersion (3 g of amine in 50 ml of water).

A pH of 5 next was established by the addition of 5 wt% NaOH and the suspension stirred for 1 hour at 60° C. The pH then was increased to 7 by the addition of 5 wt% NaOH and the mixture stirred for a further 15 minutes to cross-link the resin and form a coating on the RAP particles. The mixture thereafter was filtered and the filter residue washed with water and dried at about 100° C. for about 16 hours in a vacuum oven.

The samples of treated red phosphorus were tested for stability and the results compared with those for untreated red phosphorus, red phosphorus treated only with resin, red phosphorus treated with aluminum hydroxide and epoxy resin, and red phosphorus treated with titanium dioxide alone.

The stability to oxidation of the red phosphorus was tested by maintaining the samples in the oven at 70° C. under 100% relative humidity and measuring the acidity, expressed as $H_3PO_4$, by pH titration. The results obtained are set forth in the graph of FIG. 1. The legends correspond to the samples listed in Table 1 below.

It will be seen from the results of FIG. 1 that red phosphorus treated with 1000 ppm Ti and small quantities of resin has about the same stability to oxidation as 3000 ppm Ti, and is more stable than when treated with resin alone or with aluminum and resin. At 2000 ppm Ti and 3000 ppm Ti in combination with resin, the stability was increased further and was greater than $TiO_2$ alone or a combination of $Al(OH)_3$ with epoxy resin.

The treated samples were also tested for phosphine evolution and compared with untreated samples. One gram portions were stirred with water in vials (69 cu cm) fitted with a septum to provide for instant access by syringe. After repeated stirring and leaving to stand at room temperature, the phosphine concentration was determined by gas chromatography with a flame photometric detector. The results obtained are reproduced in the following Table I:

TABLE I

| Sample No. | Sample Treatment | Exposure (Days) | PH$_3$ Con. (ppm) |
| --- | --- | --- | --- |
| 1 | 0.78% resin[1] | 6 | 0.20 |
| 2 | 0.64% resin[2] | 6 | 0.16 |
| 3 | 3000 ppm Ti + 0.78% resin[1] | 6 | 0.25 |
| 4 | 2000 ppm Ti + 0.78% resin[1] | 6 | 0.30 |
| 5 | 3000 ppm Al + 0.78% resin[1] | 6 | 0.22 |
| 6 | 1000 ppm Ti + 0.36% resin[2] | 4 | 0.44 |
| 7 | 1000 ppm Ti + 0.50% resin[2] | 4 | 0.24 |
| 8 | 2000 ppm Ti + 0.36% resin[2] | 4 | 0.58 |
| 9 | 2000 ppm Ti + 0.50% resin[2] | 4 | 0.28 |
| 10 | 3000 ppm Ti + 0.20% resin[2] | 4 | 0.65 |
| 11 | 3000 ppm Ti | 6 | 0.83 |
| 12[3] | 2000 ppm Ti + 0.50% resin[2] | 9 | 0.25 |
| 13 | Untreated RAP | 5 | 5.80 |

Notes:
[1] Resin to hardener ratio of 1:1
[2] Resin to hardener ratio of 1:0.6
[3] In this experiment, the titanium was deposited as the phosphate.

As may be seen from the results of Table I, phosphine evolution was greatly decreased by treatment of the red amorphous phosphorus with resin alone or in combination with Ti or Al. Phosphine evolution was less for the resin-treated samples than for treatment with Ti alone.

Example 2

This Example illustrates stabilization of red amorphous phosphorus when stored wet.

The procedure of Example 1 was repeated, except that the red phosphorus was not dried after treatment. Oxidation stability and phosphine evolution were determined as described in Example 1. The oxidation stability determinations were plotted graphically and appear as FIG. 2, while the phosphine evolution determinations are reproduced below in Table II:

TABLE II

| Sample No. | Sample Treatment | Exposure (days) | PH$_3$ Con. (ppm) |
| --- | --- | --- | --- |
| 1 | Untreated RAP | 6 | 20.8 |
| 2 | 3000 ppm Ti | 6 | 5.9 |
| 3 | 2000 ppm Ti + 0.6% epoxy resin | 6 | 1.1 |
| 4 | 2000 ppm Ti + 0.9% epoxy resin | 6 | 2.1 |
| 5 | 0.9% epoxy resin | 6 | 2.1 |
| 6 | 5000 ppm Ti | 6 | 6.1 |

It will be seen from the results of FIG. 2 that the use of the combination of titanium dioxide and epoxy resin leads to enhanced oxidation stability. The results of Table II show significantly decreased phosphine evolution for wet samples treated with the combination of titanium dioxide and epoxy resin.

Example 3

This Example illustrates stabilization of red phosphorus by a combination of titanium dioxide and melamine resin.

Red amorphous phosphorus of particle size typically 0.15 to 0.01 mm was suspended in water to a concentration of 20 g in 100 ml of water and agitated and admixed with 3.4 ml of a 10% aqueous solution of $TiOSO_4 \cdot H_2SO_4 \cdot 8H_2O$. NaOH (1.0N) was then added to establish a pH of 3. A 10% aqueous solution of a melamine resin was added to the mixture in an amount sufficient to provide the desired treatment and the pH again adjusted to a value of about 3 by the addition of 5% $H_3PO_4$. The suspension was heated with agitation to 95° C., allowed to react for 1 hour and filtered. The pH was controlled during this curing period of the resin at about pH 3. The filter residue was washed with water and dried at about 100° C. for about 16 hours in a vacuum oven.

The melamine resin used was a methylated melamine-formaldehyde resin sold by Monsanto under the trademark Scripset 101. The resin was purchased in the form of a 75% aqueous solution. The resin was a polycondensation product of melamine and formaldehyde.

The samples were tested for stability to oxidation and for phosphine evolution in the manner described in Example 1 and the results compared with those for resin alone and for untreated red phosphorus. The oxidation stability results for Scripset 101-treated RAP were plotted graphically and appear as FIG. 3 while the phosphine evolution data for Scripset 101-treated RAP is reproduced in Table III below:

TABLE III

| Sample No. | Sample Treatment | Exposure (days) | PH$_3$ Con. (ppm) |
| --- | --- | --- | --- |
| 1 | 2000 ppm Ti + 1% resin | 6 | 0.54 |
| 2 | 2000 ppm Ti + 0.5% resin | 6 | 0.57 |
| 3 | 3000 ppm Ti + 0.5% resin | 6 | 0.45 |
| 4 | 1% resin | 6 | 0.91 |
| 5 | 2% resin | 6 | 0.84 |
| 6 | 2000 ppm Ti + 0.5% epoxy | 16 | 0.61 |
| 7 | Untreated RAP | 6 | 2.23 |

Figure 3:
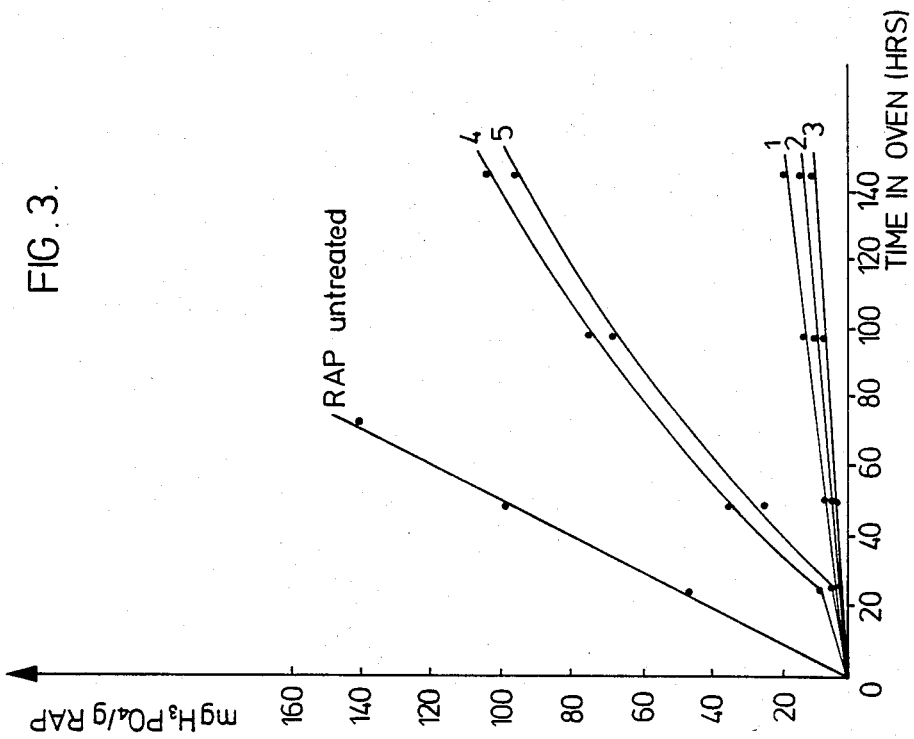
FIG. 3 is a graphical representation of the effect of titanium dioxide, titanium phosphate and a melamine-formaldehyde resin on the oxidation stability of red phosphorus.

As may be seen from the results of FIG. 3, RAP stabilized with both $TiO_2$ and melamine resin is stable against oxidation but the resin alone is not very effective. Phosphine evolution was decreased by treatment with both $TiO_2$ and melamine resin in comparison with untreated RAP and treatment with resin alone.

Example 4

This Example illustrates stabilization of red phosphorus by a combination of titanium dioxide and urea-formaldehyde resin.

The treatment procedure of Example 3 was repeated using two urea-formaldehyde resins, except that the pH was controlled during the curing of the resin and adjusted to 2.9 to 3.0 with the use of phosphoric acid, as required. The resins used were those sold by Monsanto under the trademarks Resimene LTX-31-61 and LTX-31-62. LTX-31-61 is a modified urea-formaldehyde resin having a minimum solids content of 98%, a viscosity at 25° C. of 1800 cps and a density at 25° C. of 1.14 g/ml. LTX-31-62 is a modified urea-formaldehyde resin having a solids content of 93 to 97%, a density at 25° C. of 1.09 g/ml and a viscosity at 25° C. of 600 cps.

The samples were tested for stability to oxidation and for phosphine evolution in the manner described in Example 1 and the results compared with those for resin alone and for untreated red phosphorus. The oxidation stability results were plotted graphically and appear as FIG. 4 while the phosphine evolution data is reproduced in Table IV below:

TABLE IV

| Sample No. | Sample Treatment | Exposure (days) | PH$_3$ Con. (ppm) |
| --- | --- | --- | --- |
| 1 | 0.5% LTX 31-61 | 12 | 0.8 |
| 2 | 1.0% LTX 31-61 | 12 | 0.9 |
| 3 | 2000 ppm Ti + 0.5% LTX 31-61 | 12 | 1.7 |
| 4 | 2000 ppm Ti + 1.0% LTX 31-61 | 12 | 2.2 |
| 5 | 2000 ppm Ti$^1$ + 1.0% LTX 31-61 | 12 | 2.7 |
| 6 | 2000 ppm Ti + 0.5% LTX 31-62 | 5 | 0.5 |
| 7 | 2000 ppm Ti + 1.0% LTX 31-62 | 5 | 0.5 |

Note:
$^1$Ti was precipitated as titanium phosphate.

As may be seen from the graphical results of FIG. 4 the combination of TiO$_2$ or titanium phosphate with the urea-formaldehyde resins increased stability, with the LTX 31-62 resin being more effective.

Example 5

This Example contains a compilation of data from previous Examples with some additional experimental results for the purposes of comparison and the drawing of conclusions from the data.

Selected data from previous Examples is repeated in Table V below:

TABLE V

| Sample Treatment | Time in Oven (hrs) | Acidity (mg H$_3$PO$_4$/g RAP) | Exposure (days) | PH$_3$ Con. (ppm) | Example (sample) |
| --- | --- | --- | --- | --- | --- |
| 3000 ppm Ti | 168 | 4 | 6 | 0.9 | 1(11) |
| 3000 ppm Al as Al(OH)$_3$ | 120 | 88$^x$ | — | — | — |
| 0.78 wt % epoxy resin | 168 | 19.5 | 6 | 0.2 | 1(1) |
| 3000 ppm Ti + 0.78% epoxy | 168 | 1.5 | 6 | 0.25 | 1(3) |
| 3000 ppm Al + 0.75% epoxy | 168 | 12.5 | 6 | 0.2 | 1(5) |
| 2000 ppm Ti | 144 | 17.0$^x$ | — | — | — |
| 2000 ppm Ti + 2000 ppm Al | 144 | 16.0$^x$ | — | — | — |
| 2000 ppm Ti + 0.5% epoxy | 168 | 2.1 | 6 | 0.3 | 3(6) |
| 2000 ppm Ti + 0.5% melamine | 168 | 11.7 | 6 | 0.6 | 3(2) |
| 0.5% melamine | 168 | 90.2$^x$ | 5 | 0.9 | — |
| 0.5% urea-formaldehyde | 122 | 114.0 | 12 | 0.8 | 4(1) |
| 2000 ppm Ti + 0.5% U-F | 122 | 39.0 | 12 | 1.7 | 4(3) |
| 2000 ppm Ti + 0.5% U-F | 144 | 17.0 | 5 | 0.5 | 4(6) |

$^x$Data obtained from additional experiments

The following conclusions can be drawn from this data:

(a) TiO$_2$ in combination with epoxy resin improved the stability of RAP treated thereby by a factor of about 5 when compared with resin alone, whereas Al(OH)$_3$ in combination with the epoxy resin improved the stability only by a factor of about 2;

(b) TiO$_2$ in combination with melamine resin improved the stability of RAP treated thereby by a factor of about 8 when compared with RAP treated by resin alone;

(c) TiO$_2$ in combination with urea-formaldehyde resin improved the stability of RAP treated thereby by a factor of about 3 when compared with treatment with resin alone;

(d) Treatment of RAP with TiO$_2$ and epoxide resins gave the best overall result in terms of best stability against oxidation and lowest evolution of phosphine;

(e) In general, treatment of RAP with resins, especially epoxy resin decreases the amount of phosphine evolved;

(f) While both TiO$_2$ and Al(OH)$_3$ are stabilizers of RAP against oxidation, the addition of Al(OH)$_3$ to RAP treated with TiO$_2$ does not improve the stability of RAP.

SUMMARY OF DISCLOSURE

In summary of this disclosure, the present invention provides a novel red amorphous phosphorus having improved stability against oxidation and phosphine generation by treatment with titanium dioxide or titanium phosphate and an organic resin. Modifications are possible within the scope of this invention.

What I claim is:

1. A homogeneous blend of red phosphorus having a particle size of at most about 2 mm and a mixture of titanium in the form of titanium dioxide or titanium phosphate and an organic resin, said titanium being present in an amount of about 0.05 to about 1.0 wt.% and said organic resin being present in an amount of about 0.1 to about 5.0 wt.%, said organic resin being selected from the group consisting of an epoxy resin, a melamine-formaldehyde resin and a urea-formaldehyde resin.

2. The blend of claim 1 wherein said red phosphorus particle size is about 0.01 to 0.15 mm.

3. A process for producing treated red phosphorus which comprises:
   forming a slurry of red phosphorus particles of particle size of at most about 2 mm,
   heating said slurry to a temperature of about 60° to about 95° C.,
   adding to the heated slurry a titanium compound which enables titanium dioxide or titanium phosphate precipitates in said slurry, adjusting the pH of said slurry to a value of about 2 to 4 to effect precipitation of titanium dioxide or titanium phosphate on the red phosphorus particles in an amount of about 0.05 to about 1.0 wt.% as Ti, introducing a water-soluble or water-emulsifiable uncured organic resin to said slurry and subjecting said slurry to conditions which effect precipitation of cured organic resin on the red phosphorus particles in an amount of about 0.1 to about 5.0 wt.%, separating the red phosphorus particles so treated from the slurry, washing the separated red phosphorus particles with water, and drying the separated washed red phosphorus particles to form a homogeneous blend of red phosphorus particles, titanium dioxide or titanium phosphate, and cured organic resin.

4. The process of claim 13 wherein said slurry is heated to a temperature of about 80° to 90° C. in said titanium compound treatment.

5. The process of claim 3 wherein said washed red phosphorus particles are dried at about 100° to about 130° C.

6. The process of claim 3 wherein said titanium compound is titanium sulphate, whereby titanium dioxide precipitates on said red phosphorus particles.

7. The process of claim 3 wherein said titanium compound is titanium sulphate and orthophosphoric acid or a water-soluble salt of orthophosphoric acid also is added to said slurry, whereby titanium phosphate precipitates on said red phosphorus particles.

8. The process of claim 3 wherein said organic resin is an epoxy resin, a hardener for the resin is additionally introduced to the slurry, the pH of the slurry thereafter is adjusted to a value in the range of about 4 to about 6 and the temperature of the slurry is adjusted to a value of about 40° to about 80° C., the slurry is stirred for about 0.5 to about 2 hours to initial cross-linking of the resin, the pH of the slurry thereafter is raised to about 7 to 8 and the cross-linking completed in about 10 to about 30 minutes.

9. The process of claim 3 wherein said organic resin is a melamine-formaldehyde resin, after addition of the resin the pH of the slurry is adjusted to a value in the range of about 2.5 to about 4, the temperature of the slurry is adjusted to a value in the range of about 80° to about 100° C., and the slurry is stirred for about 0.5 to about 2 hours to effect heat curing of the resin.

10. The process of claim 3 wherein said organic resin is a urea-formaldehyde resin, after addition of the resin the pH of the slurry is adjusted to a value in the range of about 2.5 to about 4.0, the temperature of the slurry is adjusted to a value in the range of about 80° to about 100° C., and the slurry is stirred for about 0.5 to about 2 hours to effect heat curing of the resin.

* * * * *